(12) United States Patent
Sakai et al.

(10) Patent No.: US 7,646,926 B2
(45) Date of Patent: Jan. 12, 2010

(54) IMAGE ENCODING APPARATUS

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 11/287,438

(22) Filed: Nov. 28, 2005

(65) Prior Publication Data

US 2006/0222245 A1 Oct. 5, 2006

(30) Foreign Application Priority Data

Mar. 29, 2005 (JP) .............................. 2005-095110

(51) Int. Cl.
G06K 9/36 (2006.01)
G06K 9/46 (2006.01)

(52) U.S. Cl. ...................................... 382/232

(58) Field of Classification Search ................. 382/232; 375/E7.14, E7.177
See application file for complete search history.

(56) References Cited

U.S. PATENT DOCUMENTS

| | | | | |
|---|---|---|---|---|
| 5,452,104 | A * | 9/1995 | Lee | 358/426.14 |
| 5,717,705 | A * | 2/1998 | Shikakura et al. | 714/746 |
| 5,905,813 | A * | 5/1999 | Terane | 382/239 |
| 6,181,711 | B1 | 1/2001 | Zhang et al. | |
| 6,728,409 | B2 * | 4/2004 | Inoue et al. | 382/232 |
| 6,806,049 | B1 | 10/2004 | Maekawa et al. | |
| 2002/0085768 | A1 * | 7/2002 | Yokose et al. | 382/248 |
| 2004/0066973 | A1 | 4/2004 | Prakash et al. | |
| 2007/0030177 | A1 * | 2/2007 | Monro | 341/50 |

FOREIGN PATENT DOCUMENTS

| | | |
|---|---|---|
| JP | 6-70174 | 3/1994 |
| JP | 6-164941 | 6/1994 |
| JP | 7-99577 | 4/1995 |
| JP | 7-184204 | 7/1995 |
| JP | 10-145790 | 5/1998 |
| JP | 10-200892 | 7/1998 |
| JP | 2000-232888 | 8/2000 |
| JP | 2000-333175 | 11/2000 |
| JP | 2003-304402 | 10/2003 |

(Continued)

OTHER PUBLICATIONS

Takahara, T. et al., "A new resolution progressive coding scheme using a sorting algorithm," Proceedings of 7th IEEE International Conference on Image Processing, Sep. 10, 2000, 3, 198-201.*

(Continued)

*Primary Examiner*—Samir A Ahmed
*Assistant Examiner*—Li Liu
(74) *Attorney, Agent, or Firm*—Staas & Halsey LLP

(57) ABSTRACT

An image encoding apparatus includes an extracting unit and a replacing unit. An image is subjected to quantized orthogonal transformation and quantization, and quantized orthogonal transform coefficients are grouped and encoded group-wise. The extracting unit extracts, from among a group of quantized orthogonal transform coefficients, those quantized orthogonal transform coefficients that are within a designated range starting from boundary values of the next lower group. The replacing unit replaces values of the quantized orthogonal transform coefficients extracted, with values of the quantized orthogonal transform coefficients of the next lower group.

13 Claims, 10 Drawing Sheets

FOREIGN PATENT DOCUMENTS

| WO | 96/34495 | 10/1996 |
| WO | 2004/023820 | 3/2004 |

OTHER PUBLICATIONS

Hu, P. et al., "A wavelet to DCT progressive image transcoder," Proceedings 2000 International Conference on Image Processing, Vancouver, Canada, September.*

Notice of Rejection issued in corresponding Japanese Patent Application No. 2005-095110, mailed on Jul. 17, 2007.

Extended European Search Report for corresponding European Application 05292496.6-1247; dated Aug. 4, 2009.

"Optimisation of Two-Layer SNR Scalability for MPEG-2 Video"; D. Wilson et al.; Department of Electronic Systems Engineering, University of Essex; pp. 2637-2640.

"An overview of quantization in JPEG 2000"; Michael W. Marcellin et al.; Signal Processing Image Communication; pp. 73-84.

* cited by examiner

FIG.2
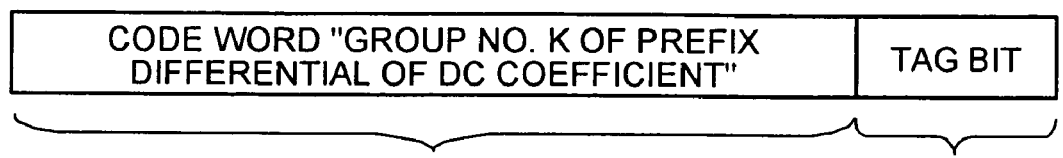
DC COEFFICIENT
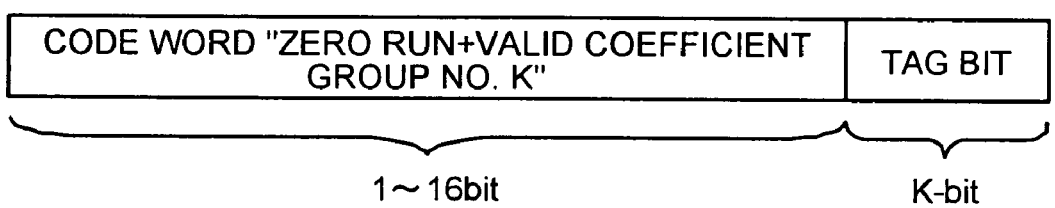
AC COEFFICIENT

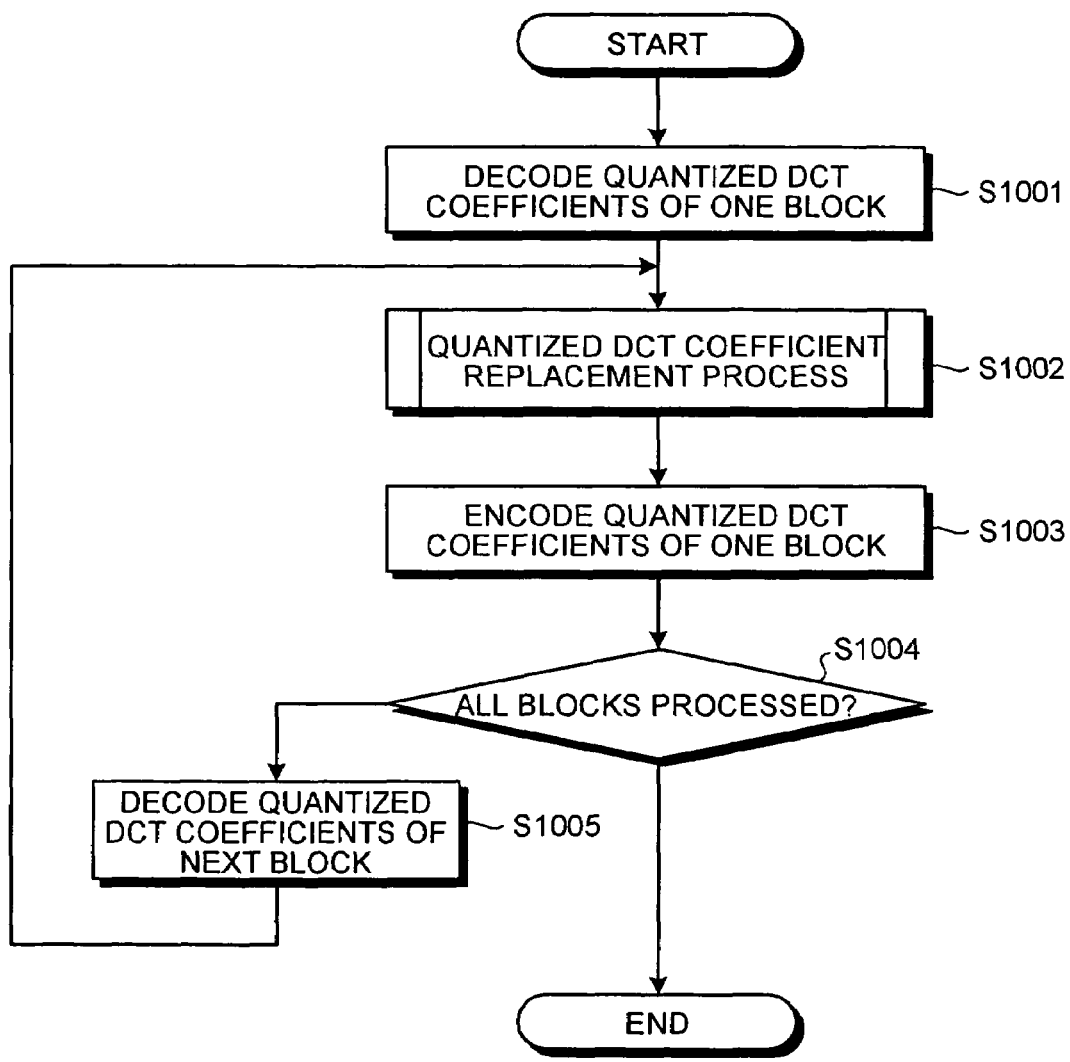

IMAGE ENCODING APPARATUS

BACKGROUND OF THE INVENTION

1. Field of the Invention

The present invention relates to an image encoding apparatus that generates quantized orthogonal transform coefficients of an image, and encodes the image by grouping together quantized coefficients of a predetermined size.

2. Description of the Related Art

Well known conventional image encoding apparatuses encode an image by grouping together quantized coefficients, of a predetermined size, obtained by orthogonal transformation and quantization of the image.

As the image input devices such as digital cameras are getting more advanced with larger number of pixels, the compressed Joint Photographic Experts Group (JPEG) data size is getting larger. Hence, there is an increasing need to reduce the JPEG data size so that the image data size reduces or more data can be stored in the same storage capacity.

In the JPEG image compression technique, changing the quantization threshold generally lowers the encoding bit number. Specifically, increasing the quantization threshold increases the invalid coefficients, and reduces the valid coefficients, thereby resulting in a low encoding bit number.

However, each image has only one type of coefficients. Therefore, changing the quantization threshold also changes the value of all the coefficients having frequency component that is same as the changed quantized coefficient, thereby adversely affecting the image quality.

Japanese Patent Laid-Open Publication No. H6-70174 and Japanese Patent Laid-Open Publication No. H10-200892 disclose a method for reducing the encoding bit number and suppressing its effect on the image, by partially removing valid coefficients. Specifically, to lower the encoding bit number, the valid coefficients are reduced by assigning the value of zero to some of the valid coefficients of quantized Discrete Cosine Transformed (DCT) coefficients.

Although in the above conventional technology, changing the quantization threshold prevents image degradation, the image quality is still adversely affected to a certain degree, because the value of zero is assigned to some valid coefficients.

Additionally, in the aforementioned conventional technology, to prevent an adverse effect on the image, absolute values can be assigned only to a small number of valid coefficients. Thus, the number of valid coefficients are limited, which itself acts as a limiting factor for lowering the encoding bit number.

SUMMARY OF THE INVENTION

It is an object of the present invention to at least solve the problems in the conventional technology.

According to an aspect of the present invention, an image encoding apparatus that subjects an image to orthogonal transformation and quantization to obtain quantized orthogonal transform coefficients, groups the quantized orthogonal transform coefficients according to a predetermined size, and encodes the quantized orthogonal transform coefficients group by group, the image encoding apparatus includes an extracting unit that extracts from a group, the quantized orthogonal transform coefficients that fall within a designated range starting from boundary values of a next lower group; and a replacing unit that replaces values of the quantized orthogonal transform coefficients extracted, with values of the quantized orthogonal transform coefficients of a lower group.

According to another aspect of the present invention, an image encoding method that includes subjecting an image to orthogonal transformation and quantization to obtain quantized orthogonal transform coefficients, grouping the quantized orthogonal transform coefficients according to a predetermined size, and encoding the quantized orthogonal transform coefficients group by group, the image encoding method including extracting from a group, the quantized orthogonal transform coefficients that fall within a designated range starting from boundary values of a next lower group; and replacing values of the quantized orthogonal transform coefficients extracted, with values of the quantized orthogonal transform coefficients of a lower group.

According to another aspect of the present invention, a computer-readable recording medium that records thereon a computer program for image encoding that includes subjecting an image to orthogonal transformation and quantization to obtain quantized orthogonal transform coefficients, grouping the quantized orthogonal transform coefficients according to a predetermined size, and encoding the quantized orthogonal transform coefficients group by group, the computer program including instructions, which when executed, cause a computer to execute: extracting from a group, the quantized orthogonal transform coefficients that fall within a designated range starting from boundary values of a next lower group; and replacing values of the quantized orthogonal transform coefficients extracted, with values of the quantized orthogonal transform coefficients of a lower group.

The other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 illustrates a code structure of quantized DCT coefficients;

FIG. 10 is a flowchart of a process executed by the image encoding apparatus according to the second embodiment.

DETAILED DESCRIPTION OF THE PREFERRED EMBODIMENTS

Exemplary embodiments of the present invention are explained in detail below, with reference to the accompanying drawings.

In the present embodiment, the present invention is applied to valid coefficients (those AC coefficients among the quantized DCT coefficients that have a non-zero value) of an image encoded according to the Joint Photographic Experts Group (JPEG) technique that utilizes Discrete Cosine Transformation (DCT) as a method of "orthogonal transformation".

Figure 1:
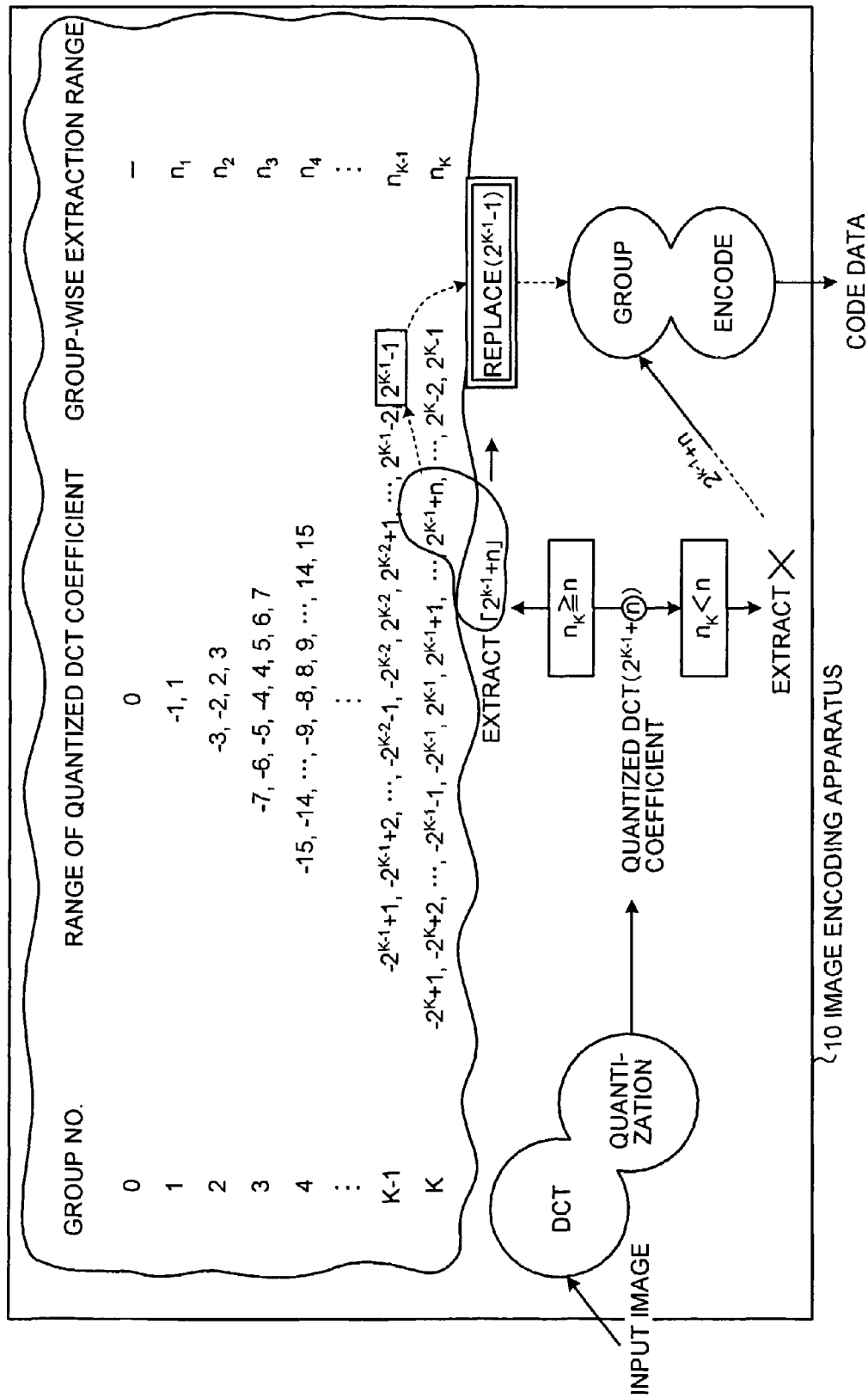
FIG. 1 illustrates an overview and salient feature of an image encoding apparatus according to the present invention.

An overview and salient feature of the image encoding apparatus according to the present invention are explained first. FIG. 1 illustrates the overview and salient feature of the image encoding apparatus according to the present invention. As shown in FIG. 1, an image encoding apparatus 10 groups together quantized DCT coefficients obtained by orthogonal transformation and quantization according to size, and encodes the groups of quantized DCT coefficients.

The principal feature of the image encoding apparatus 10 according to the present invention is "quantized DCT coefficient replacement process". The quantized DCT coefficient replacement process involves extracting, from among the quantized DCT coefficients of each group, the quantized DCT coefficients that fall within a designated range from the boundary values of the next lower group, and replacing the values of the extracted quantized DCT coefficients with the values of the quantized DCT coefficients belonging to the next lower group. The image encoding apparatus according to the present invention enhances the effect of lowering the encoding bit number by implementing the quantized DCT coefficient replacement process while preventing deterioration of the image quality.

Specifically, by implementing such quantized DCT coefficient replacement process, the image encoding apparatus 10 replaces the value of only those valid coefficients that have little effect on the image quality.

In other words, in the JPEG compression technique, the valid coefficients are divided into groups of sizes of power-of-two. For instance, as shown in FIG. 1, the range of valid coefficients included in Group K are those having a value that falls between $2^{k-1}$ and $2^k-1$ as well as between $-2^k+1$ and $-2^{k-1}$. That is, in terms of absolute value, the range is from $2^{k-1}$ to $2^k-1$ The image encoding apparatus 10 extracts for replacement all the valid coefficients "$2^{k-1}+n$" belonging to Group K for which the value of "n" is not greater than the threshold value "$n_k$", which is determined based on the effect on the image quality. Further, the threshold value "$n_k$" for each group is set in such a way that if the valid coefficient is small, the threshold value "$n_k$" is reduced, and if the valid coefficient is large, the threshold value "$n_k$" is increased. Therefore, the encoding bit number can be lowered more effectively while maintaining a constant image quality level.

Moreover, the value of the extracted quantized DCT coefficient is replaced with the value of the quantized DCT coefficient of the next lower group. Therefore, the image encoding apparatus 10 assigns a shorter code word and shortens the bit length of tag data identifying the value of the coefficient in the group.

In other words, the occurrence frequency tends to be high to the extent of the valid coefficients having a small absolute value, and the number of coefficients would be greater to the extent the lower group in which the valid coefficient having a small absolute value is included. Consequently, by replacing the value of the valid coefficient with the value of the coefficient of the next lower group, a shorter code word can be assigned (see FIG. 2).

Further, as the range of the value of the valid coefficients narrows to the extent of the lower group, the bit length of the tag data for identifying the value of the coefficient in the group also gets shortened. Thus, replacing the value of the valid coefficient with the value of the coefficient of the next lower group also shortens the bit length of the tag data (see FIG. 2).

Thus, the conventional technology involves replacing the value of some of the valid coefficients of the quantized DCT coefficients with zero and causes degradation of the image quality and limits the number of valid coefficients that can be assigned an absolute value. Whereas, in the image encoding apparatus according to the present invention, those valid coefficients that have little effect on the image quality are extracted for replacement and the values of the extracted valid coefficients are replaced with those of the next lower group. Consequently, a shorter code word can be assigned and the bit length of the tag data identifying the value of the coefficient in the group is shortened. Consequently, the effect of lower encoding bit number can be enhanced while preventing an adverse effect on the image quality.

The image encoding apparatus according to the first embodiment is explained next.

Figure 3:
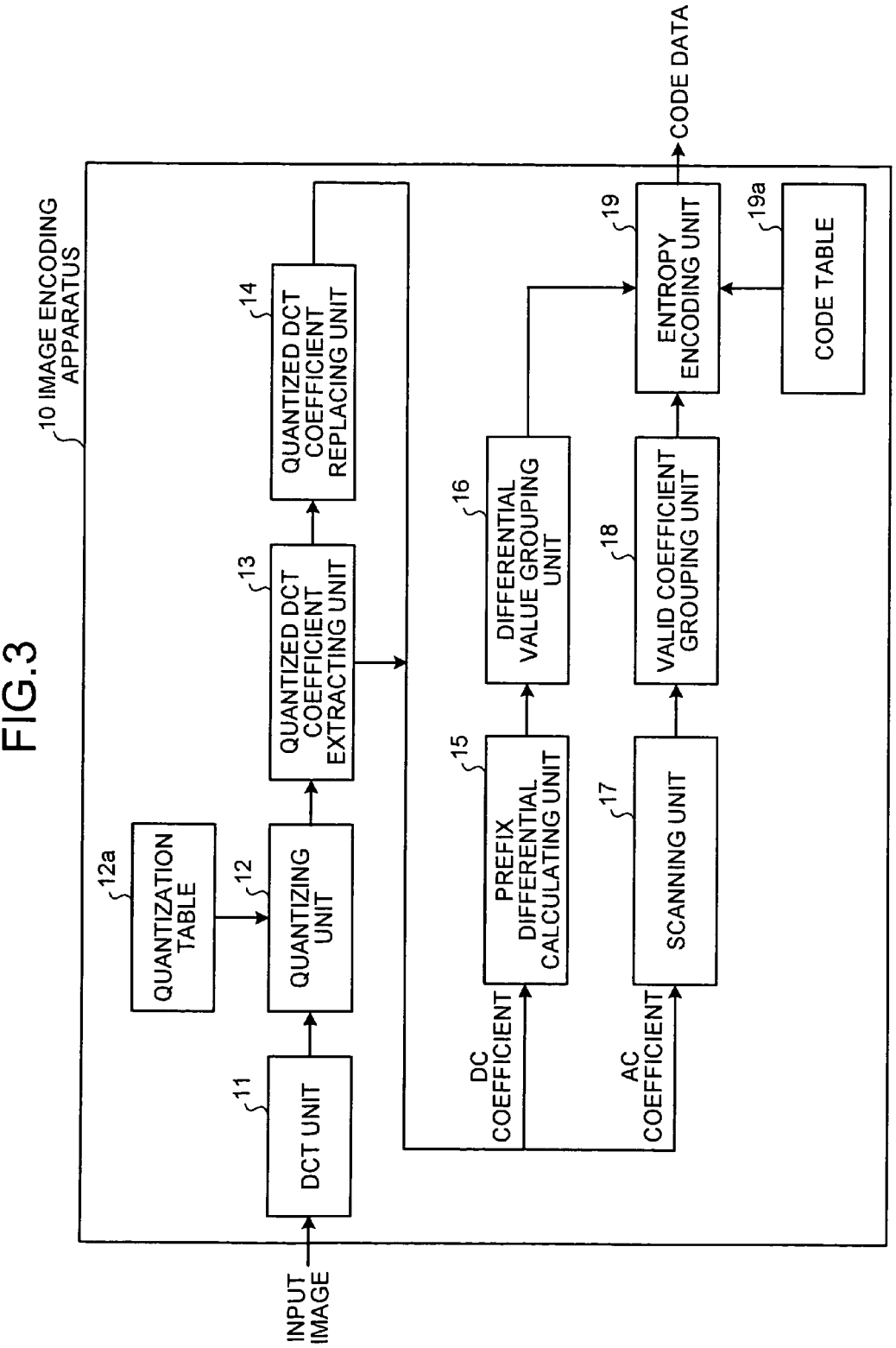
FIG. 3 is a block diagram of the image encoding apparatus according to a first embodiment.

FIG. 3 is a block diagram of the image encoding apparatus according to the first embodiment. The image encoding apparatus 10 includes a DCT unit 11, a quantizing unit 12, a quantized DCT coefficient extracting unit 13, a quantized DCT coefficient replacing unit 14, a prefix differential calculating unit 15, a differential value grouping unit 16, a scanning unit 17, a valid coefficients grouping unit 18, and an entropy encoding unit 19.

The DCT unit 11 applies discrete cosine transformation (DCT), which is a form of orthogonal transformation, on the input image. Specifically, the DCT unit 11 partitions the input image data (data having a pixel value) into blocks of 8×8 pixels and converts each block into a frequency component by applying 2D DCT calculation.

The quantizing unit 12 refers to a quantization table 12a, quantizes one block of the image converted into the frequency component by the DCT unit 11, and outputs the quantized DCT coefficient to the quantized DCT coefficient extracting unit 13. The quantization table 12a contains the quantization threshold value according to the compression rate desired by the user.

The quantized DCT coefficient extracting unit 13 extracts, from among the quantized DCT coefficients of each group, the quantized DCT coefficient that falls within a designated range from the boundary value of the next lower group. For example, as shown in FIG. 1, the quantized DCT coefficient extracting unit 13 extracts for replacement all the valid coefficients "$2^{k-1}+n$" belonging to Group K for which the value of "n" is not greater than the threshold value "$n_k$", which is determined based on the effect on the image quality.

The quantized DCT coefficient extracting unit 13 sets the threshold value "$n_k$" according the size of the valid coefficient, reducing the threshold value "$n_k$" if the valid coefficient is small and increasing the threshold value "$n_k$" if the valid coefficient is large. Consequently, the quantized DCT coefficient extracting unit 13 helps lower the encoding bit number more effectively while maintaining a constant image quality level.

Further, the quantized DCT coefficient extracting unit 13 extracts only the quantized DCT coefficient of a designated frequency component, for processing by the quantized DCT coefficient replacing unit 14. Specifically, the lower the frequency the greater the adverse effect on the image quality. Hence, the quantized DCT coefficient extracting unit 13 exerts control such that the value of only those valid coefficients whose frequency is above a certain degree is selectively changed.

More specifically, when the value of the lowest degree DC coefficient is changed, the average level of the entire block is affected, thus affecting the continuity with the adjoining blocks. Further, the low frequency AC coefficient contributes significantly to the pixel value of the block, potentially degrading the image quality (see FIG. 4). Thus, only the quantized DCT coefficients not including the DC component and the low frequency AC coefficients can be extracted for replacement of value. This avoids value replacement of quantized DCT coefficients that affect the image quality significantly, and prevents degradation of the restored image.

Further, the quantized DCT coefficient extracting unit 13 checks a decompression error that occurs between the restored image obtained upon encoding by replacing the values of the quantized DCT coefficients and that obtained upon encoding by not replacing the values, and extracts the quantized DCT coefficients for processing by the quantized DCT coefficient replacing unit 14 only if the decompression error is within permissible limits.

A method of determining whether the decompression error is within permissible limits is explained next. The maximum absolute value of the decompression error E that occurs in each pixel in a block in which the value of the quantized DCT coefficient with a value D of the lower group is derived from the expression given below, which elicits DCT calculation and quantization calculation.

$$E = \{D \times q(u,v) \times \cos(\pi/16)^2\}/4 \approx D \times q(u,v)/4$$

where q(u,v) is a quantization threshold value for the DCT coefficient having a horizontal frequency u and a vertical frequency v.

Thus, the maximum decompression error E that occurs when the value of the quantized DCT coefficient is changed is calculated by the aforementioned expression and it can be determined whether a designated permissible limit is crossed.

Thus, the decompression error that occurs between the restored image obtained upon encoding by replacing the values of the quantized DCT coefficients and that obtained upon encoding by not replacing the values is checked, and the quantized DCT coefficients are extracted for processing by the quantized DCT coefficient replacing unit 14 only if the decompression error is within permissible limits. Therefore, the value of the quantized DCT coefficients that adversely affect the image quality are definitively prevented from being replaced, thus preventing deterioration of image quality of the restored image.

Figure 5:
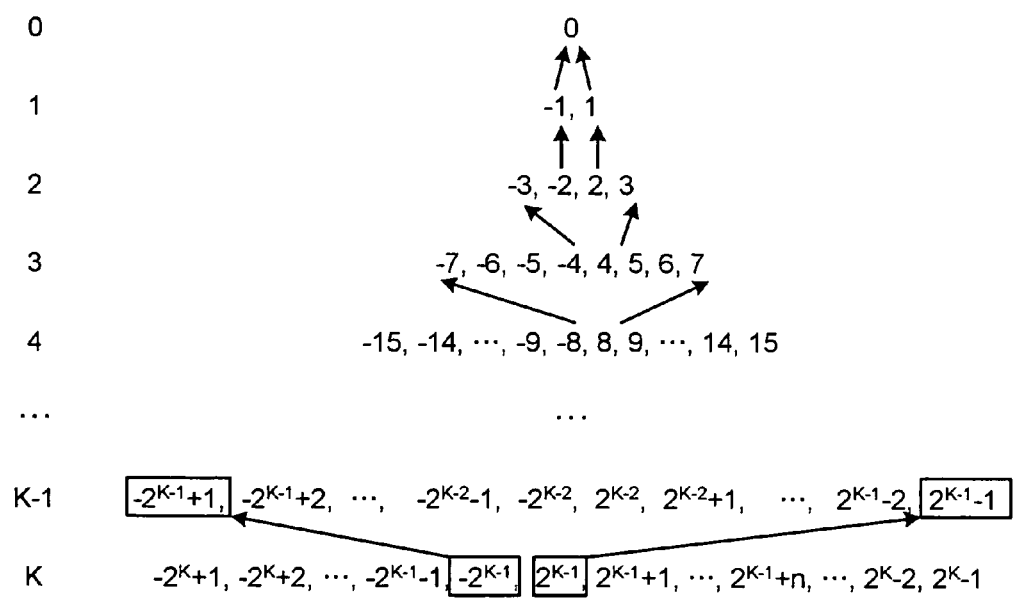
FIG. 5 illustrates a process of replacing the quantized DCT coefficients.

The quantized DCT coefficient replacing unit 14 replaces the value of the quantized DCT coefficients extracted by the quantized DCT coefficient extracting unit 13 with the value of the quantized DCT coefficients belonging to a lower group. Specifically, as shown in FIG. 5, the quantized DCT coefficient replacing unit 14 replaces the values of the quantized DCT coefficients extracted by the quantized DCT coefficient extracting unit 13 with the boundary values of the next lower group.

Thus, values that are very close to the original values of the quantized DCT coefficients can be assigned. Consequently, degradation of image quality can be effectively prevented.

The prefix differential calculating unit 15 calculates the difference in the values (prefix differential values) between the DC coefficients output by the quantized DCT coefficient extracting unit 13 and the DC coefficients of the previous block. The differential value grouping unit 16 groups the differential values (prefix differential values) calculated by the prefix differential calculating unit 15.

Figure 4:
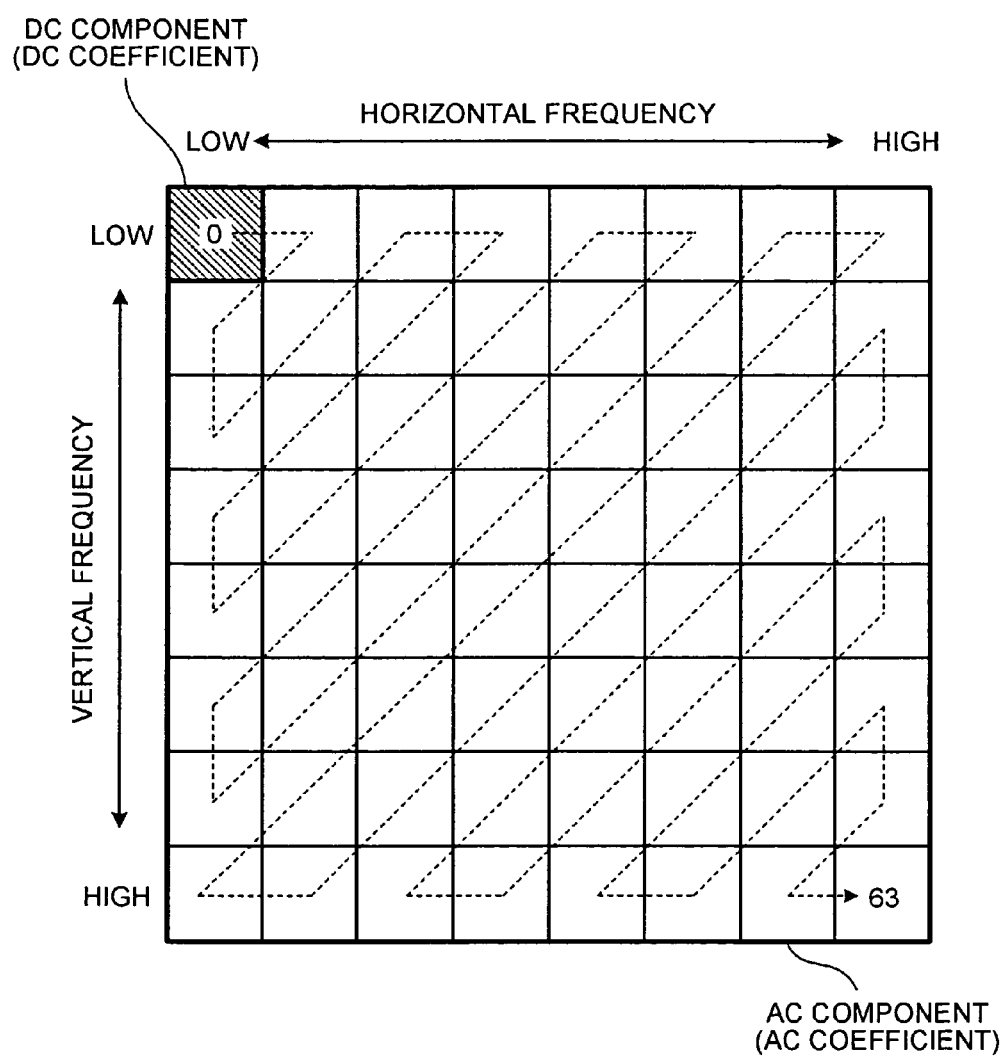
FIG. 4 illustrates a relation between the quantized DCT coefficients and a scanning sequence.

The scanning unit 17 scans the AC coefficients output by the quantized DCT coefficient extracting unit 13 or the quantized DCT coefficient replacing unit 14. Specifically, the scanning unit 17 scans the AC frequency in a zigzag pattern, starting with the lowest frequency, as shown in FIG. 4, and detects invalid coefficients having long run lengths of zeros (zero run) and valid non-zero coefficients. The valid coefficients grouping unit 18 groups zero run and the valid coefficients detected by the scanning unit 17. Group zero is set only for the DC coefficient. The AC coefficients that process the coefficients having the value of zero as a zero run do not have a group zero.

The entropy encoding unit 19 carries out entropy encoding of the DC coefficients and the AC coefficients based on a code table 19a. Specifically, the entropy encoding unit 19 carries out entropy encoding of group numbers of the differential values (prefix differential values) grouped by the differential value grouping unit 16, and the tag data identifying the differential value in the group is attached before and after the code.

More specifically, as shown in FIG. 1, for the DC coefficient, the entropy encoding unit 19 creates the code data by combining the code word (having 1-16 bits) corresponding to the group number K of the prefix differential of the DC coefficient and the tag data of K bits. For the AC coefficient, the entropy encoding unit 19 creates the code data by combining the zero run plus the code word (having 1-16 bits) corresponding to the group number K of the valid coefficients and the tag data of K bits.

The tag data has the same number of bits as the group number. For example, if Group 3 includes eight different types of coefficients, each of the eight coefficients is uniformly identified by a tag data having three bits. If the prefix differential of the DC coefficient is zero, no tag data is attached. A single block of code data generally consists of one DC coefficient and a plurality of AC coefficients. Other code words such as zero run length (ZRL) denoting 16 or more successive occurrences of zero, or end of block (EOB) indicating that no more non-zero values occur in the zigzag scanned sequence are also used. The code data of the entire image is obtained by combining the code data of all the blocks.

Figure 6:
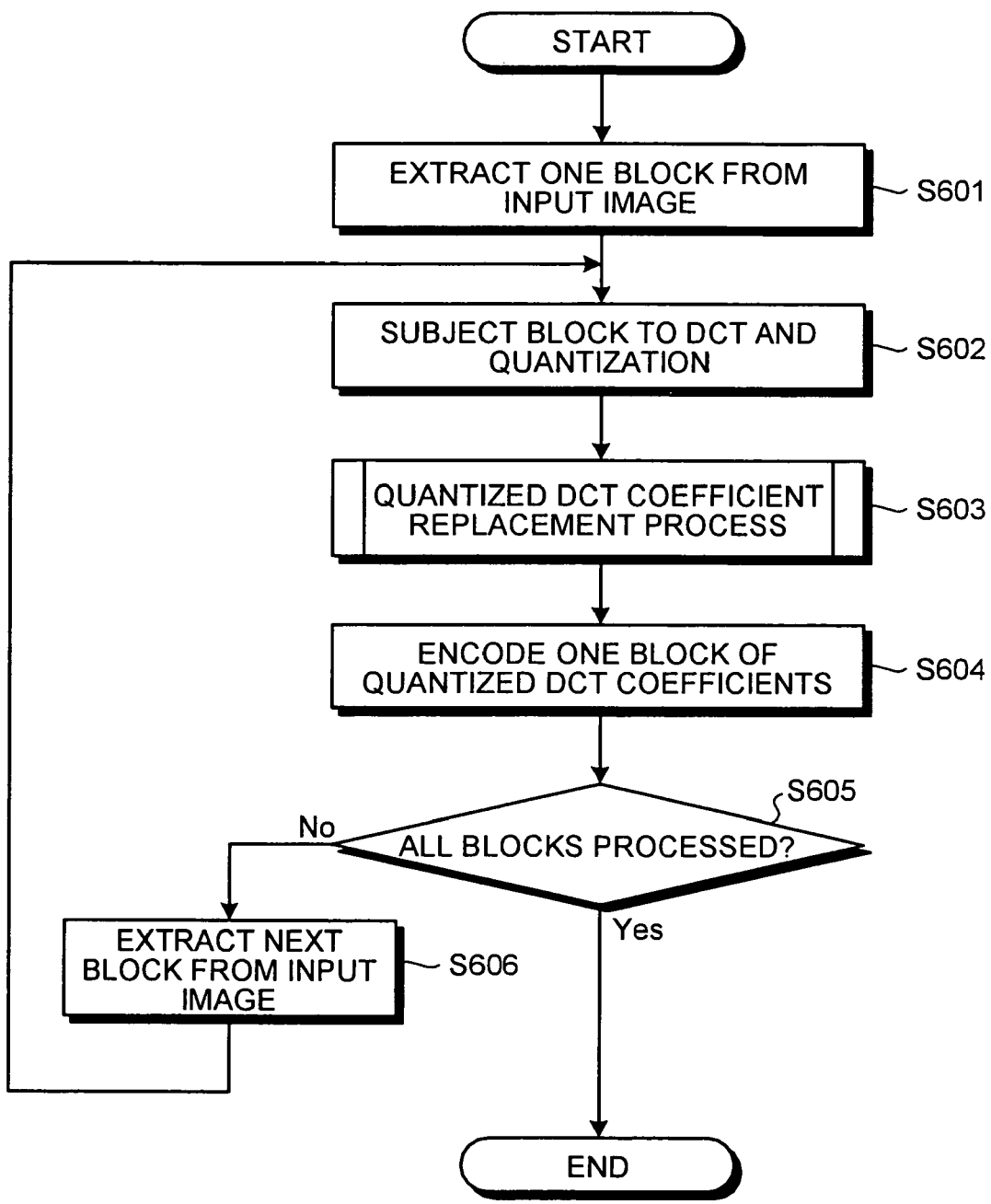
FIG. 6 is a flowchart of a process executed by the image encoding apparatus according to the first embodiment.

The process executed by the image encoding apparatus according to the first embodiment is explained next. FIG. 6 is a flowchart of the process executed by the image encoding apparatus according to the first embodiment. As shown in FIG. 6, the DCT unit 11 and the quantizing unit 12 read the input image as blocks of 8×8 pixels (step S601), and apply DCT and quantization block by block to create quantized DCT coefficients (step S602).

The quantized DCT coefficient extracting unit 13 and the quantized DCT coefficient replacing unit 14 subject the quantized DCT coefficients to the "quantized DCT coefficient replacement process" (step S603).

Figure 7:
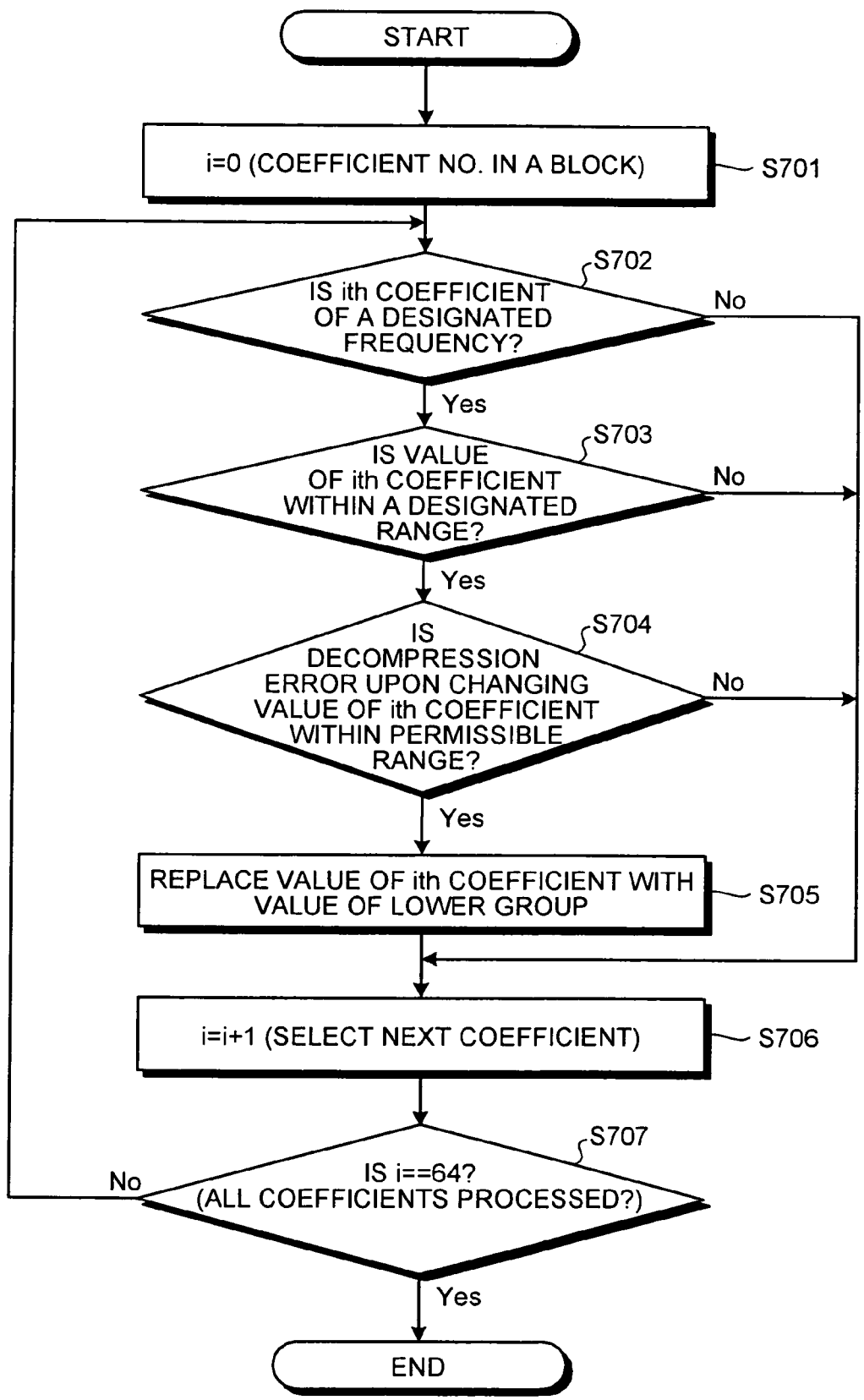
FIG. 7 is a flowchart of a quantized DCT coefficient replacement process.

The "quantized DCT coefficient replacement process" is explained in detail next. FIG. 7 is a flowchart of the quantized DCT coefficient replacement process, in which the value of quantized DCT coefficients of a single block is changed, to lower the encoding bit number.

As shown in FIG. 7, the quantized DCT coefficient extracting unit 13 sets the variable i, representing the quantized DCT coefficient number in the block, to zero (step S701). Thus, the variable i points to the first quantized DCT coefficient. In the JPEG technique, each block contains 8×8, that is 64 quantized DCT coefficients, which are encoded by scanning them in a zigzag pattern, beginning with the lowest frequency, as shown in FIG. 4.

The quantized DCT coefficient extracting unit 13 determines whether the ith quantized DCT coefficient is of a designated frequency (step S702). If the ith quantized DCT coefficient is of the designated frequency (Yes at step S702), the process advances to step S703. Otherwise (No at step S702), the process jumps to step S706.

Next, the quantized DCT coefficient extracting unit 13 determines whether value of the ith quantized DCT coefficient is within a designated range (step S703). If the value of the ith quantized DCT coefficient is within the designated range (Yes at step S703), the process advances to step S704. Otherwise (No at step S703), the process jumps to step S706).

For example, if the replacement range of the value of the quantized DCT coefficient is assumed to be "$n_k$", the quantized DCT coefficient extracting unit 13 selects all the quantized DCT coefficients in group K that have an absolute value in the range of $2^{k-1}$ to $2^{k-1}+n$ (where n is a non-zero integer).

Next, the quantized DCT coefficient extracting unit 13 determines whether, upon replacing the value of the ith quantized DCT coefficient with a value of the coefficient of the next lower group, the amount of change of the pixel value of the restored image for the block in question is within permissible limits (step S704). If the decompression error is within permissible limits (Yes at step S704), the process advances to step S705. Otherwise (No at step S704), the process jumps to step S706).

Next, the quantized DCT coefficient replacing unit 14 replaces the value of the ith quantized DCT coefficient with the value of the coefficient of the next lower group (step S705). For example, as shown in FIG. 5, the quantized DCT coefficient replacing unit 14 replaces the values "−8" and "8" of Group 4 with "−7" and "7", respectively, of Group 3. The same method is applied for replacing values of other groups.

The quantized DCT coefficient extracting unit 13 points to the next quantized DCT coefficient by adding 1 to the variable i (step S706).

The quantized DCT coefficient extracting unit 13 determines whether i is 64, that is, whether all the quantized DCT coefficients in the block have been processed (step S707). If i is 64 (Yes at step S707), all the quantized DCT coefficients have be processed and the process ends. If i is less than 64 (No at step S707), steps S702 through S706 are carried out for the remaining quantized DCT coefficients.

Thus, by repeating steps S702 through S707, the values of the quantized DCT coefficients of a block are replaced, to lower the encoding bit number.

Returning to FIG. 6, the prefix differential calculating unit 15, the differential value grouping unit 16, the scanning unit 17, the valid coefficients grouping unit 18, and the entropy encoding unit 19 encode, using the conventional encoding method, the quantized DCT coefficients that have been subjected to the "quantized DCT coefficient replacement process" (step S604).

It is determined whether all the blocks of the input image have been subjected to the encoding process (step S605). If encoding process has been carried out for all the blocks (Yes at step S605), the process ends.

If there are unprocessed blocks (No at step S605), the next block of the input image is read (step S606), and steps S602 through S605 are repeated until all the blocks have been processed (Yes at step S605).

Figure 8:
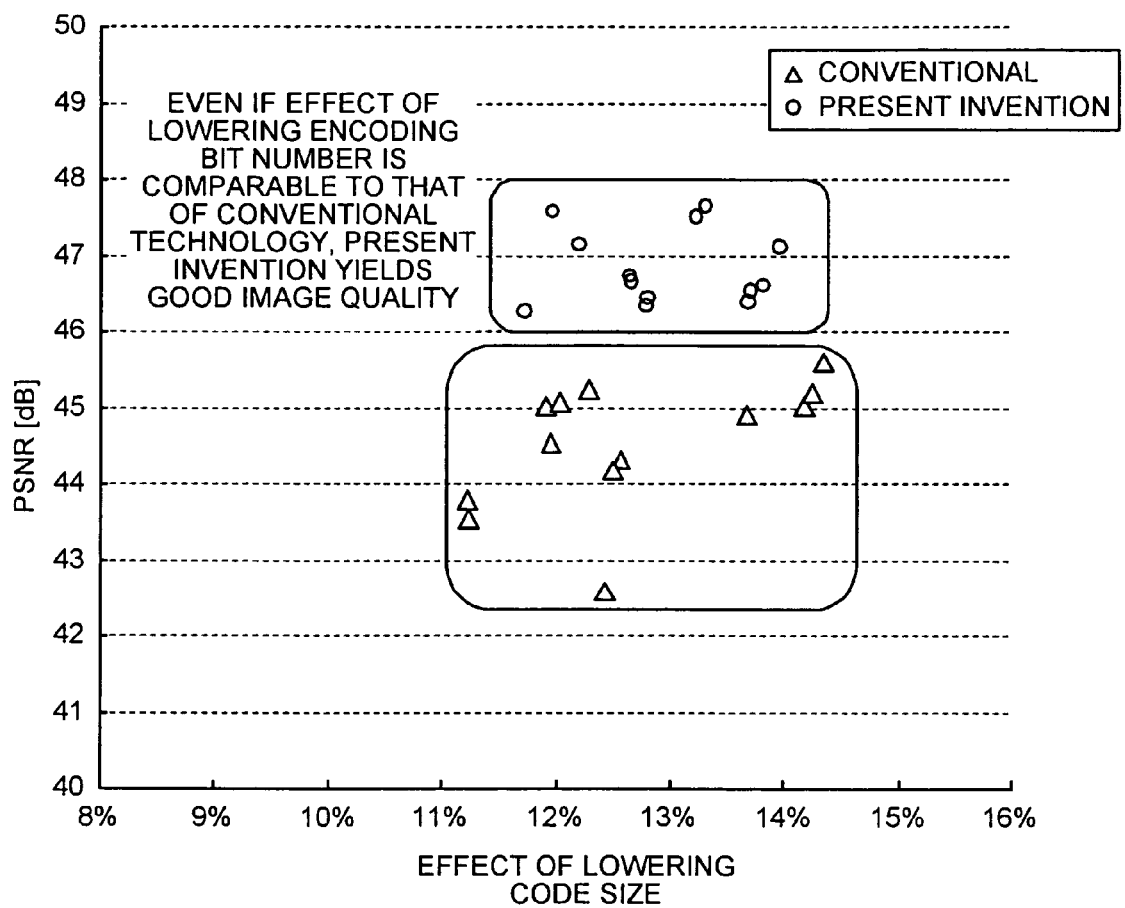
FIG. 8 illustrates comparison between results obtained using a conventional technology and the present invention.

The results obtained using the conventional technology and the present invention are compared next. FIG. 8 illustrates a comparison between results obtained using the conventional technology and the present invention. The graph in FIG. 8 illustrates the relation between the lowered encoding bit number and the image quality represented by Peak Signal-to-Noise Ratio (PSNR). In the example illustrated in FIG. 8, the encoding bit number is lowered by removing the valid coefficients having an absolute value of 1 in the conventional technology, and by determining a replacement range for the valid coefficients by applying the present invention, so that the encoding bit number is comparable to that obtained in the conventional technology.

As shown in FIG. 8, the encoding bit number lowered using the present invention clearly produces a higher PSNR, indicating a better image quality. It can thus be deduced that in the present invention, fewer encoding bits will produce the same image quality as would be obtained by applying the conventional technique.

Thus, by using an encoding apparatus that employs orthogonal transformation, quantization, grouping of quantized coefficients, and entropy encoding of grouped quantized replacement coefficients, the data volume of the code data can be significantly reduced as compared to that in the conventional technology, and without compromising the image quality, thus yielding good image quality at byte size.

Thus, in the image encoding apparatus 10 according to the first embodiment, those valid coefficients that will least affect the image quality are extracted, and their values are replaced with the values of the coefficients of the next lower level group. Consequently, a shorter code word can be assigned in addition to reducing the bit length of the tag data identifying the value of the coefficient in the group. Thus, the encoding bit number can be lowered without causing any degradation to the image quality.

The image encoding apparatus according to the second embodiment is explained next. In the second embodiment, already encoded code data is restored to quantized DCT coefficients, and values of the restored quantized DCT coefficients are replaced with the values of the quantized DCT coefficients of the next lower group. Only those parts of the second embodiment that are functionally different from those of the first embodiment are explained here.

Figure 9:
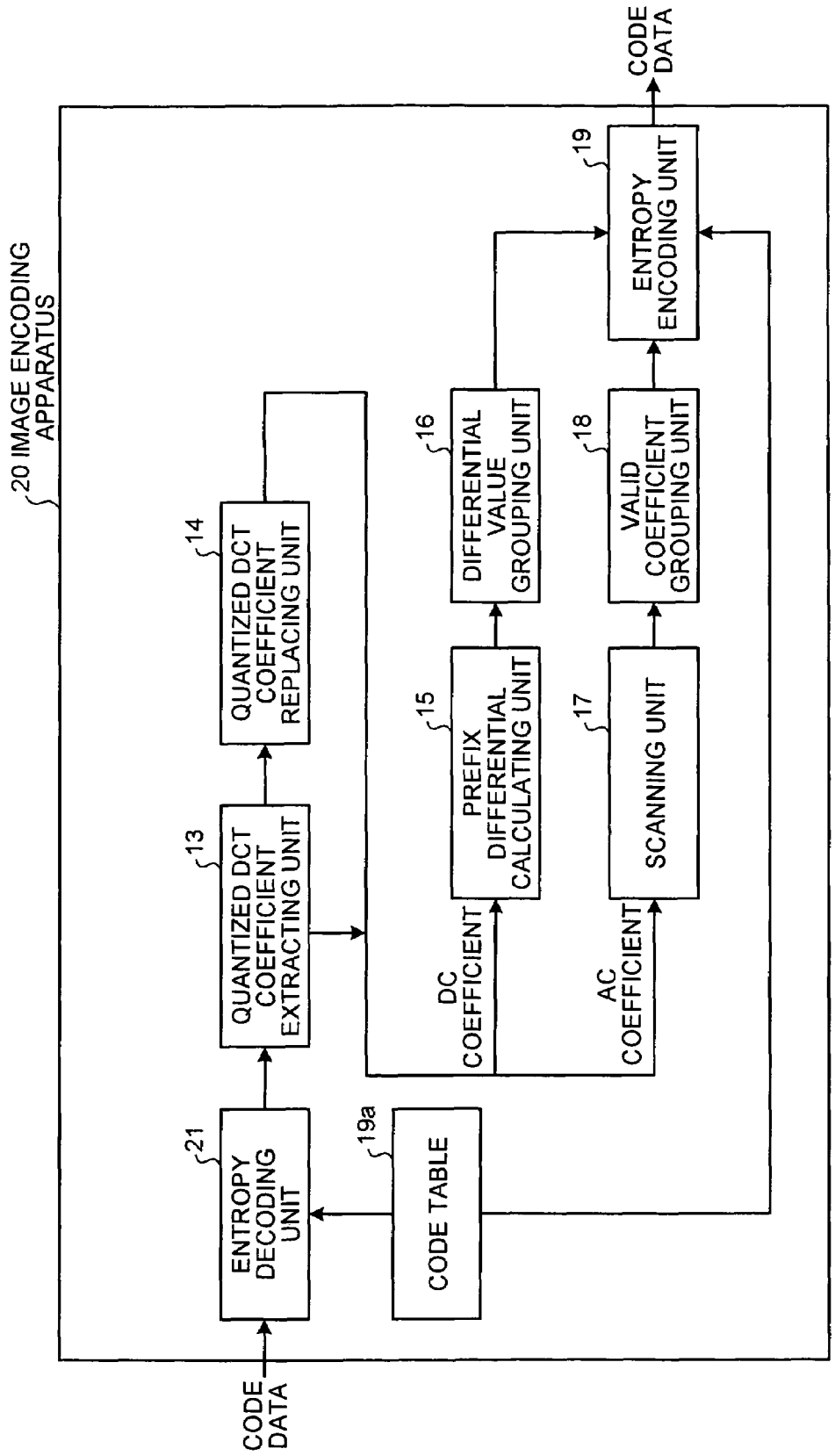
FIG. 9 is a block diagram of an image encoding apparatus according to a second embodiment.

FIG. 9 is a block diagram of the image encoding apparatus according to the second embodiment. As shown in FIG. 9, in addition to all the parts in the image encoding apparatus 10 according to the first embodiment, an image encoding apparatus 20 according to the second embodiment includes an entropy decoding unit 21 that restores the encoded code data to quantized DCT coefficients.

The entropy decoding unit 21 entropy decodes already encoded code data, restores the coefficients that were subjected to orthogonal transformation and quantization, subjects the valid coefficients from among the restored coefficients to "quantized DCT coefficient replacement process", and subjects the resulting coefficients to entropy encoding once again. Thus, the reason for providing the entropy decoding unit 21 is to lower the encoding bit number of already compressed code data.

The process executed by the image encoding apparatus according to the second embodiment is explained next. FIG. 10 is a flowchart of the process executed by the image encoding apparatus according to the second embodiment. As shown in FIG. 10, the entropy decoding unit 21 decodes the quantized DCT coefficients belonging to one block of the code data (step S1001).

The quantized DCT coefficient extracting unit 13 and the quantized. DCT coefficient replacing unit 14 subject the quantized DCT coefficients which have been subjected to DCT and quantization to "quantized DCT coefficient replacement process" (step S1002). The "quantized DCT coefficient replacement process" is the same as the one explained in the first embodiment, and hence, explanation thereof is omitted.

The prefix differential calculating unit 15, the differential value grouping unit 16, the scanning unit 17, the valid coefficients grouping unit 18, and the entropy encoding unit 19 encode, using the conventional encoding method, the quantized DCT coefficients that have been subjected to the "quantized DCT coefficient replacement process" (step S1003).

It is determined whether all the blocks of the input image have been subjected to the "quantized DCT coefficient replacement process" (step S1004). If "quantized DCT coefficient replacement process" has been carried out for all the blocks (Yes at step S1004), the process ends.

If there are unprocessed blocks (No at step S1004), the next block of the input image is read (step S1005), and steps S1002 and S1003 are repeated until all the blocks have been processed (Yes at step S1004).

Thus, in the image encoding apparatus 20 according to the second embodiment, already encoded code data is restored to quantized DCT coefficients, and the values of the restored quantized DCT coefficients are replaced with the values of the quantized DCT coefficients of the next lower group. Consequently, as in the first embodiment, the encoding bit number is lowered without compromising on the image quality.

In the second embodiment, as the value of the DC coefficient does not change, the entropy decoding unit 21 may extract the code data without decoding the quantized DCT coefficients of the code data of the DC coefficients, and the entropy encoding unit 19 may use the code data of the DC coefficients as it is. Therefore, the entropy encoding process, as well as the prefix differential calculating unit 15 and the differential value grouping unit 16 can be done away with.

Although the invention has been described with respect to a specific embodiment for a complete and clear disclosure, the appended claims are not to be thus limited, but are to be construed as embodying all modifications and alternative constructions that may occur to one skilled in the art which fairly fall within the basic teaching herein set forth.

For example, the first and second embodiments are explained using the JPEG compression method. However, other image compression methods, such as MPEG compression method, may be similarly applied.

Further, the extraction standard used by the quantized DCT coefficient extracting unit 13 in the first and the second embodiments combines the position of the quantized DCT coefficient in the group, the frequency component, and the decompression error. However, any one of the three or two in any combination thereof may be used as the extraction standard.

In the first and the second embodiments, in the "quantized DCT coefficient replacement process", the values of the quantized DCT coefficients are replaced with the values of the quantized DCT coefficients of the next lower group. However, the values of the quantized DCT coefficients may be replaced with the values of the quantized DCT coefficients of any lower group any number of groups away.

For example, the values of the quantized DCT coefficients extracted by the quantized DCT coefficient extracting unit 13, based on the decompression error that occurs between the restored image obtained upon encoding by replacing the values of the quantized DCT coefficients and that obtain upon encoding by not replacing the values of the quantized DCT coefficients, may be replaced with the values of the quantized DCT coefficients belonging to a group that is one step beyond the group to which the extracted quantized DCT coefficients belong. In other words, the values of the quantized DCT coefficients can be replaced by maximum possible values without exceeding the permissible limits of the decompression error.

All the automatic processes explained in the first and the second embodiments can be, entirely or in part, carried out manually. Similarly, all the manual processes explained in the present embodiment can be entirely or in part carried out automatically by a known method. Further, the sequence of processes, the sequence of controls, specific names, and data including various parameters (for example, threshold value "nk", permissible limits of decompression error, etc.) can be changed as required unless otherwise specified.

The constituent elements of the image encoding apparatus illustrated are merely conceptual, and may not necessarily physically resemble the structures shown in the drawings. The device as a whole or in parts can be broken down or integrated either functionally or physically in accordance with the load or how the device is to be used. Further, some or all of the process functions can be realized by a program executable by a central processing unit (CPU) or by hardware through wired logic.

According the present invention, the effect of lowered encoding bit number can be enhanced while preventing degradation of image quality.

Moreover, degradation of image quality of the restored image is prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image encoding apparatus that subjects an image to orthogonal transformation and quantization to obtain quantized orthogonal transform coefficients, groups the quantized orthogonal transform coefficients according to a predetermined size, and encodes the grouped quantized orthogonal transform coefficients, the image encoding apparatus comprising:
    an extracting unit that extracts from a group, the quantized orthogonal transform coefficients that fall within a designated range starting from boundary values between the group and a lower group adjacent to the group; and
    a replacing unit that replaces values of the extracted quantized orthogonal transform coefficients, with values of the quantized orthogonal transform coefficients of a lower group than the group.

2. The image encoding apparatus according to claim 1, wherein
    the range for each group is predetermined, and
    the extracting unit extracts from each group, the quantized orthogonal transform coefficients that fall within the predetermined range starting from the boundary values.

3. The image encoding apparatus according to claim 1, wherein
    the extracting unit extracts only the quantized orthogonal transform coefficients having a designated frequency component.

4. The image encoding apparatus according to claim 1, wherein
    a first restored image is an image encoded by replacing the value of the quantized orthogonal transform coefficient,
    a second restored image is an image encoded without replacing the value of the quantized orthogonal transform coefficient, and
    the extracting unit extracts only the quantized orthogonal transform coefficients for which a decompression error between the first restored image and the second restored image is within permissible limits.

5. The image encoding apparatus according to claim 1, wherein
the replacing unit replaces the values of the extracted quantized orthogonal transform coefficients, with the boundary values of the lower group adjacent to the group.

6. The image encoding apparatus according to claim 1, wherein
the replacing unit replaces the values of the extracted quantized orthogonal transform coefficients, with the values of the quantized orthogonal transform coefficients of the lower group adjacent to the group.

7. The image encoding apparatus according to claim 1, wherein
a first restored image is an image obtained upon encoding by replacing the value of the quantized orthogonal transform coefficient,
a second restored image is an image obtained upon encoding by not replacing the value of the quantized orthogonal transform coefficient, and
the replacing unit replaces, based on a decompression error between the first restored image and the second restored image, the values of the extracted quantized orthogonal transform coefficients, with values of quantized orthogonal transform coefficients of a group that is at least one group beyond the lower group adjacent to the group.

8. The image encoding apparatus according to claim 1, wherein
the replacing unit restores encoded code data to quantized orthogonal transform coefficients, and replaces the values of restored quantized orthogonal transform coefficients with values of quantized orthogonal transform coefficients of a lower group than the group.

9. An image encoding method using a processor to perform:
subjecting an image to orthogonal transformation and quantization to obtain quantized orthogonal transform coefficients;
grouping the quantized orthogonal transform coefficients according to a predetermined size;
encoding the grouped quantized orthogonal transform coefficients;
extracting from a group, the quantized orthogonal transform coefficients that fall within a designated range starting from boundary values between the group and a lower group adjacent to the group; and
replacing values of the extracted quantized orthogonal transform coefficients with values of the quantized orthogonal transform coefficients of a lower group than the group.

10. The image encoding method according to claim 9, wherein
the range for each group is predetermined, and
the extracting includes extracting from each group, the quantized orthogonal transform coefficients that fall within the predetermined range starting from the boundary values.

11. The image encoding method according to claim 9, wherein
the extracting includes extracting only the quantized orthogonal transform coefficients having a designated frequency component.

12. The image encoding method according to claim 9, wherein
a first restored image is an image encoded by replacing the value of the quantized orthogonal transform coefficient,
a second restored image is an image encoded without replacing the value of the quantized orthogonal transform coefficient, and
the extracting includes extracting only the quantized orthogonal transform coefficients for which a decompression error between the first restored image and the second restored image is within permissible limits.

13. A computer readable recording medium that records thereon a computer program for image encoding that includes subjecting an image to orthogonal transformation and quantization to obtain quantized orthogonal transform coefficients, grouping the quantized orthogonal transform coefficients according to a predetermined size, and encoding the grouped quantized orthogonal transform coefficients, the computer program including instructions, which when executed, cause a computer to execute:
extracting from a group, the quantized orthogonal transform coefficients that fall within a designated range starting from boundary values between the group and a lower group adjacent to the group; and
replacing values of the extracted quantized orthogonal transform coefficients with values of the quantized orthogonal transform coefficients of a lower group than the group.

* * * * *